United States Patent
Alexander et al.

(10) Patent No.: US 9,421,465 B2
(45) Date of Patent: Aug. 23, 2016

(54) GAME PROGRESSION USING RETRIEVED PARTIAL USER DATA

(71) Applicant: Microsoft Technology Licensing, LLC, Redmond, WA (US)

(72) Inventors: Russell Alexander, Seattle, WA (US); Daniel Kyle Taylor, Redmond, WA (US); Justin Layne Nordin, Redmond, WA (US); Daniel Ryan Mitchell, Redmond, WA (US); Malia Rebecca Guerrero, Seattle, WA (US); Kurt Mar, Issaquah, WA (US); Roger Arthur Roach, Redmond, WA (US); Travis J. Muhlestein, Redmond, WA (US); Robert Unoki, Redmond, WA (US); Kenneth Michael Bayer, Kirkland, WA (US); Paul Stephen Hellyar, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 14/258,962

(22) Filed: Apr. 22, 2014

(65) Prior Publication Data

US 2015/0297999 A1    Oct. 22, 2015

(51) Int. Cl.
*A63F 9/24* (2006.01)
*A63F 13/35* (2014.01)
(Continued)

(52) U.S. Cl.
CPC ............... *A63F 13/35* (2014.09); *A63F 13/352* (2014.09); *A63F 13/49* (2014.09); *G06F 9/5027* (2013.01); *G06F 2209/503* (2013.01)

(58) Field of Classification Search
CPC .... A63F 13/35; A63F 2300/407; A63F 13/79
See application file for complete search history.

(56) References Cited

U.S. PATENT DOCUMENTS 8,244,804 B1    8/2012 Casselman
8,888,585 B1 *  11/2014 Beechey ................. A63F 13/10
                                                    463/29

(Continued)

FOREIGN PATENT DOCUMENTS

EP            0384339 A2    8/1990

OTHER PUBLICATIONS

"Amazon Introduces GameCircle for Kindle Fire", BusinessWire, Jul. 11, 2012, at http://www.businesswire.com/news/home/20120711005500/en/Amazon-Introduces-GameCircle-Kindle-Fire-Opens-APIs, pp. 1-3.*

(Continued)

*Primary Examiner* — Steve Rowland
(74) *Attorney, Agent, or Firm* — Micah Goldsmith; Doug Barker; Micky Minhas (57) ABSTRACT

A system that contains multiple game servers that have a non-user specific unused state, and a user-specific game state. When the game server is providing a game service on the other hand, the game server first obtains the user data for the user and game that is to be initiated. Accordingly, the game servers may be thought of as a bank of game servers, any one of which being potentially utilizable for incoming game requests. Once the game session is completed, the user data for the gamer may be deleted, and the game server goes back into the pool of available generic game servers. The user data is downloaded from a user data store, and may be quite limited to perhaps just that portion of the user data that relates to the game to be played.

20 Claims, 8 Drawing Sheets

(51) Int. Cl.
*A63F 13/49* (2014.01)
*G06F 9/50* (2006.01)
*A63F 13/352* (2014.01)

(56) References Cited

U.S. PATENT DOCUMENTS

| | | |
|---|---|---|
| 2006/0030408 A1 | 2/2006 | Kiiskinen |
| 2007/0021216 A1 | 1/2007 | Guruparan |
| 2007/0130150 A1* | 6/2007 | Fowler .................. A63F 13/12 |
| 2009/0253515 A1 | 10/2009 | Carr-Greg |
| 2013/0084985 A1 | 4/2013 | Green et al. |
| 2013/0123021 A1* | 5/2013 | Stubb ................. G07F 17/3237 463/42 |
| 2014/0047431 A1 | 2/2014 | Vaughan |

OTHER PUBLICATIONS

"International Search Report and Written Opinion Issued in PCT Application No. PCT/US2015/024595", Mailed Date: Jul. 9, 2015, 13 Pages.

Barboza, et al., "A Simple Architecture for Digital Games on Demand Using Low Performance Resources under a Cloud Computing Paradigm", Brazilian Symposium on Games and Digital Entertainment, Nov. 8, 2010, pp. 33-39.

Huang, et al., "GamingAnywhere: The First Open Source Cloud Gaming System", In Proceedings of the ACM Transactions on Multimedia Computing Communications and Applications, Association for Computing Machinery, vol. 10, No. 1s, Jan. 5, 2014, 25 Pages.

"Dedicated Server Gaming Solution", Published on: Sep. 16, 2013, Available at: https://cloud.google.com/developers/articles/dedicated-server-gaming-solution.

Karmali, Luke, "Xbox One Save Games Let You Instantly Resume", Published on: May 22, 2013, Available at: http://www.ign.com/articles/2013/05/22/xbox-one-save-games-let-you-instantly-resume.

"International Preliminary Report on Patentability and Written Opinion Issued in PCT Application No. PCT/US2015/024595", Mailed Date: Mar. 4, 2016., 06 Pages.

\* cited by examiner

GAME PROGRESSION USING RETRIEVED PARTIAL USER DATA

BACKGROUND

Computing systems have revolutionized the way people communicate, do business, and play. For instance, a user may engage in complex, sophisticated and realistic games using the considerable computing power of conventional gaming consoles. In order to engage in conventional rich gaming experiences, a player might typically purchase a gaming console, and also purchase a game. This alone represents a considerable investment for the player. However, there is also a wide variety of games available for any given game console. Furthermore, online services are also available to enable or enhance the gaming experience by, for example, enabling players to engage in a distributed game in which players are remotely located. Nevertheless, the player is often limited to engaging in the game when in the proximity of the gaming console.

Gamers can also engage in online games in which much of the processing power is remotely located. For instance, a user might interact with a social media application to begin a game. The game state associated with the game may be kept on a remote location and/or local to the gamer. So long as game state is preserved, the gamer may continue the game from that preserved state.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein provide a system that contains multiple game servers that have a non-user specific unused state, and a user-specific game state when the game server is used. When the game server is providing a game service, the game server first obtains the user data for the user and game that is to be initiated. Accordingly, the game servers may be thought of as a bank of game servers, any one of which being potentially utilizable for incoming game requests. Once the game session is completed, the user data for the gamer may be deleted, and the game server goes back into the pool of available generic game servers. The user data is downloaded from a user data store, and may be quite limited to perhaps just that portion of the user data that relates to the game to be played. Accordingly, a paradigm is described in which a bank of generic game servers may be assigned to any given user, while still providing each user with a user-specific experience, with their own profile information, and game saves.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein provide a system that contains multiple game servers that have a non-user specific unused state, and a user-specific game state when the game server is used. When the game server is providing a game service, the game server first obtains the user data for the user and game that is to be initiated. Accordingly, the game servers may be thought of as a bank of game servers, any one of which being potentially utilizable for incoming game requests. Once the game session is completed, the user data for the gamer may be deleted, and the game server goes back into the pool of available generic game servers. The user data is downloaded from a user data store, and may be quite limited to perhaps just that portion of the user data that relates to the game to be played. Accordingly, a paradigm is described in which a bank of generic game servers may be assigned to any given user, while still providing each user with a user-specific experience, with their own profile information, and game saves.

Some introductory discussion of a computing system will be described with respect to FIG. 1. Then, example methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
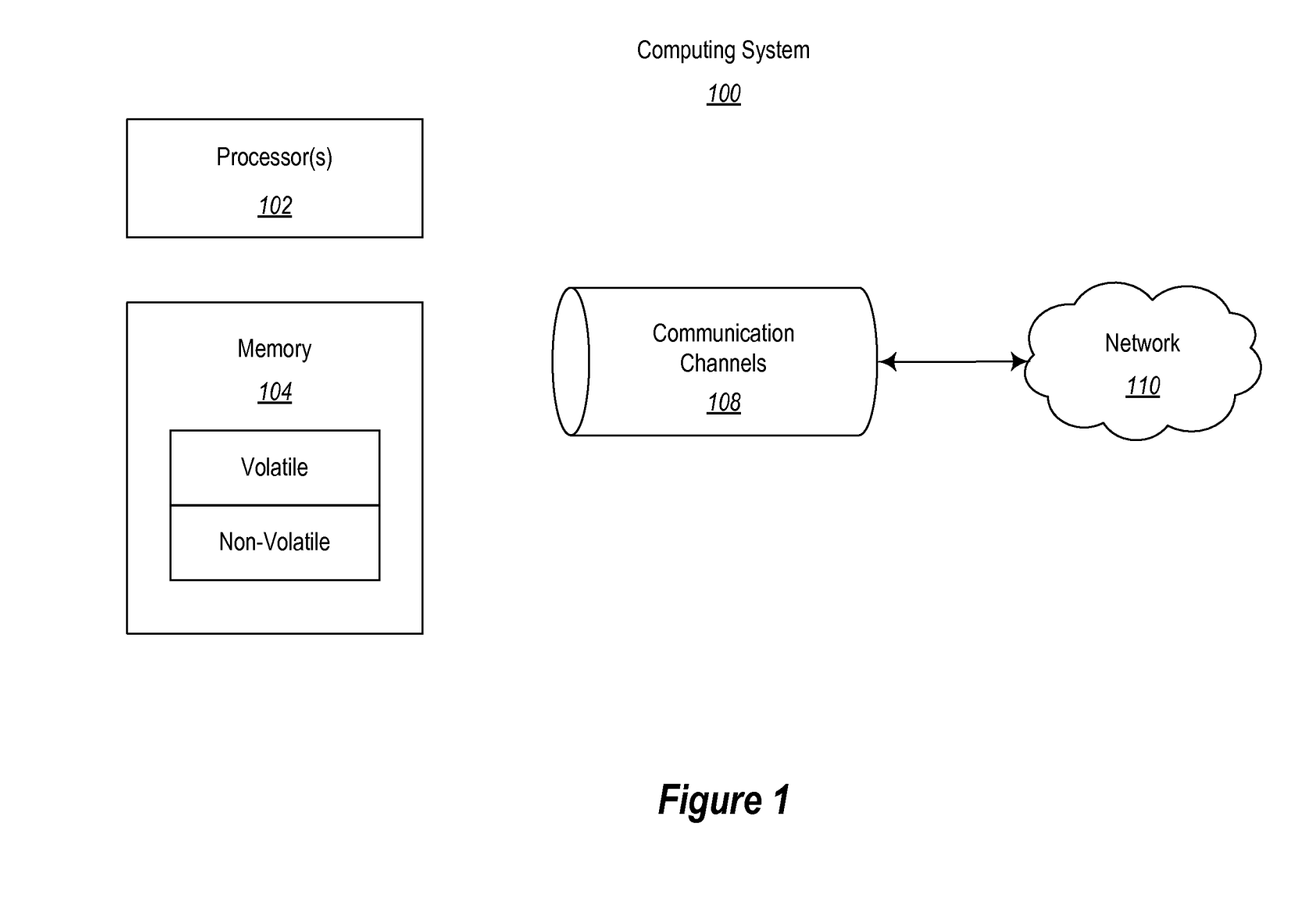
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
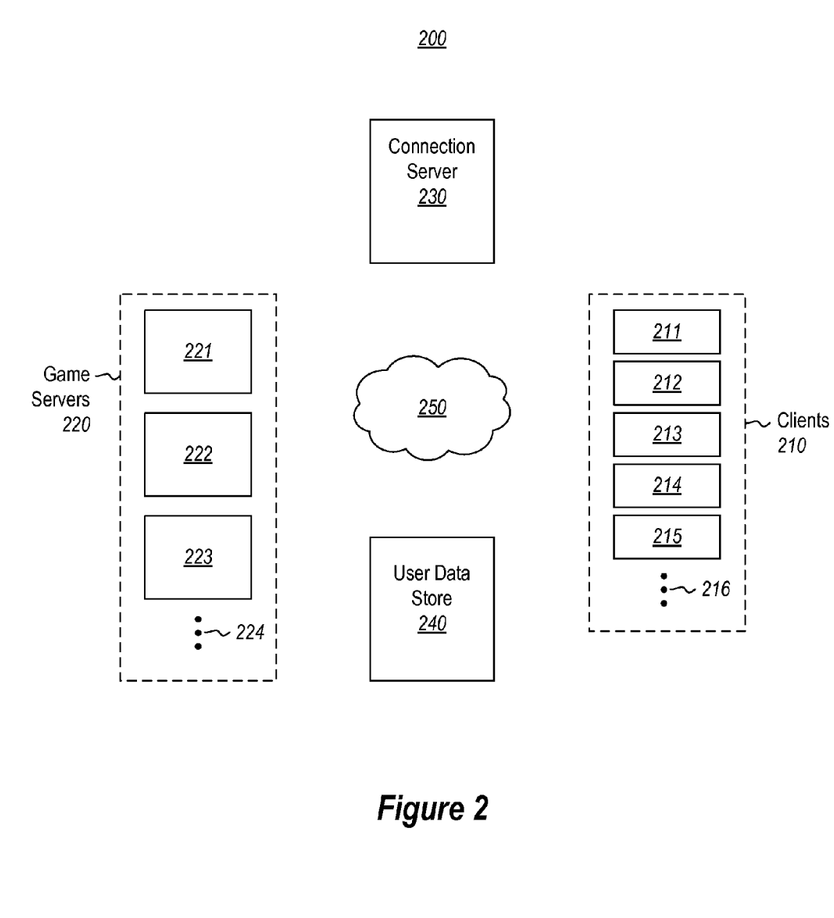
FIG. 2 illustrates a network environment in which the principles describe herein may operate and includes multiple game clients, multiple game servers, a connection server, and a user data store.

FIG. 2 illustrates a network environment 200 that includes multiple game clients 210, multiple game servers 220, a connection server 230, and a user data store 240. Each of the game clients 210, game servers 220, and the connection server 230 may be structured and operate as described above for the computing system 100 of FIG. 1. Furthermore, the user data store 240 may be managed by a computing system, such as the computing system 100 of FIG. 1. The game clients 210, game servers 220, the connection server 230, and the user data store 240 may communicate over a network 250.

The principles described herein are not limited to the particular number of clients 210 that may interact with the game servers 220. The game servers 220 may provide a service that is open to any number of clients. For instance, if the network 250 encompassed portions of the Internet between the game servers 220 and the clients 210, there may be an innumerable number of potential clients 210 that may communicate with the game servers 220 to thereby engage in a gaming experience. However, for the purpose of illustration and example only, the clients 210 are illustrated as including five clients 211 through 215, though the ellipses 216 represents that there could be fewer or greater (even much greater) than this amount. Furthermore, the ellipses 216 symbolically represent that the number of clients in communication with the game servers 220 engage in a gaming experience that may vary dynamically as the gamers associated with the clients 210 begin and end gaming.

Furthermore, the principles described herein are not limited to the number of game servers 220 either, although the principles described herein are particularly advantageous when there are multiple game servers. For the purpose of illustration and example only, the game servers 220 are illustrated as including three game servers 221, 222 and 223, though the ellipses 224 represents that there could be fewer or greater (even much greater) than this amount.

The game servers 220 may be located within a data center, although not required. Each game server 220 may, for example, be a server blade. That said, a server blade may well be capable of providing gaming service to multiple games simultaneously. Accordingly, the principles described here do not require a one-to-one mapping between game servers and physical server blades or other machines. When in a used state, the game servers provide a gaming experience to a particular gamer (or user). For instance, the game server manages game state; receives control signals from the client in response to a game manipulating gaming controls; incorporates those controls to affect game state; generates and transmits video, audio, and tactile data to the client so that the game may visualize, hear, and sense, respectively, the gaming experience; and so forth.

When in an unused state, each game server is not user specific to any particular user. Thus, each game server is maintained in an unused state as a state that is non-gamer specific. When the game server is assigned to a particular client and gamer, the game server initiates a user specific service session by loading the user data associated with that gamer and the game to be engaged in. That said, one or more of the game servers may be pre-loaded with the game the user wants to play. In response, the game server becomes user-specific and game-specific thereby entering a used state. Accordingly, the game servers 220 are a bank of generic game servers that can be assigned to any user and any game upon assignment. When the game server is done providing the game service, the game server may delete that user data (after uploading any potential user data changes), and the game server thereby returns back to the pool of available generic game servers. The term "generic" is used herein to mean that the game server is not assigned to a specific user.

The connection server 230 receives incoming game connection requests from various game clients 210. As those game requests are received, the connection server 230 decides which of the available game servers 220 is to be assigned to connect to the requesting game client 210 to fulfill the request. The connection server 230 provides a resulting assignment to the assigned game server to thereby cause the assigned game server to initialize a corresponding game session.

Figure 3:
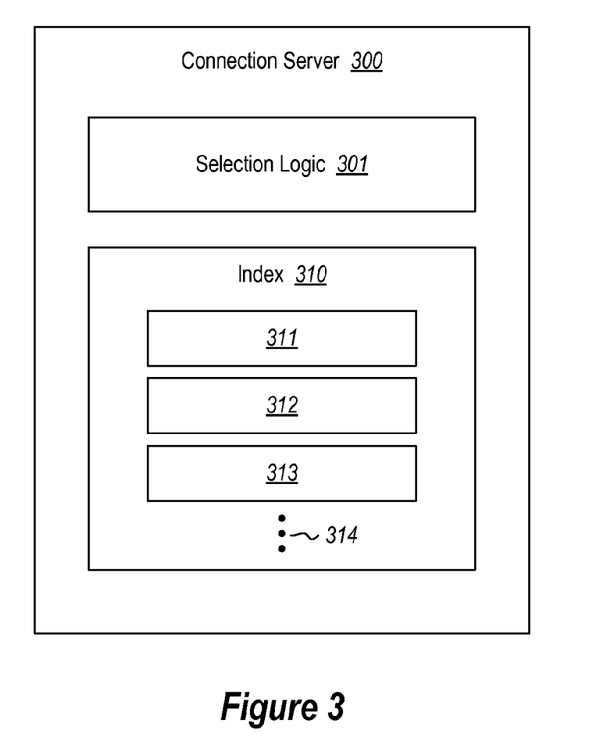
FIG. 3 abstractly illustrates a connection server that is an example of the connection server of FIG. 2, and includes selection logic and an index.

FIG. 3 abstractly illustrates a connection server 300 that is an example of the connection server 230 of FIG. 2. The connection server 300 includes selection logic 301 and an index 310. The selection logic 301 selects a corresponding unused game server to be assigned for each connection request. For instance, in FIG. 2, the selection logic of the connection server 230 may select one of the game servers 220 to handle an incoming connection request.

The index 310 includes an entry for each game server. For instance, the index 310 includes entries 311, 312 and 313. Referring to FIG. 2, each of the entries 311 through 313 might correspond to game servers 221 through 223, respectively. The ellipses 314 represents again that there may be any number of entries in the index 310, just as ellipses 224 represents that there may be any number of game servers 220. Although the embodiment has been described with respect to an index in which there are as many entries as there are game servers, this need not be the case. The availability of any of the game servers 220 may be represented in any fashion at the connection server 230.

Figure 4:
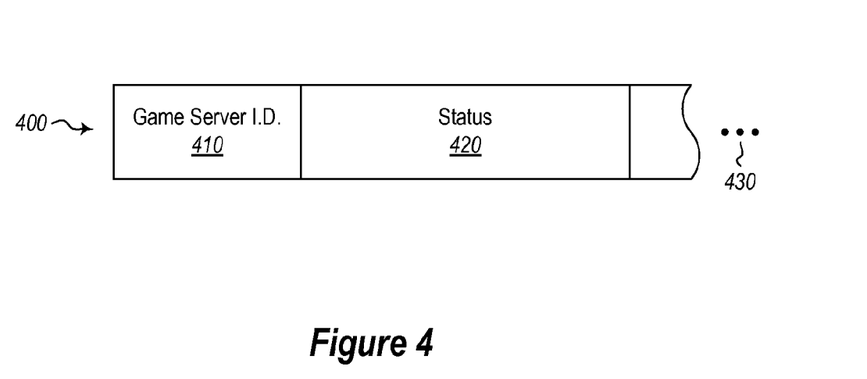
FIG. 4 illustrates an entry that is an example of any of the entries of FIG. 3, and which includes a game server identification field and a status field.

FIG. 4 illustrates an entry 400 that is an example of any of the entries of FIG. 3. The entry 400 includes a game server identification field 410, and a status field 420. The game server identification field 410 identifies the game server corresponding to the entry 400. As previously mentioned, there may be as many entries 400 as there are game servers. The status field 420 indicates whether or not the identified game server is presently in use. The connection server 300 selects from amongst the unassigned game servers when selecting a game server to fulfill an incoming game connection request. The ellipses 430 represents that there may be other fields included within the entry 400. For instance, there might be performance information, maintenance information, hardware information, or any other information regarding the corresponding game server that could be helpful in determining whether to use the game server to accommodate an incoming gaming request.

Figure 5:
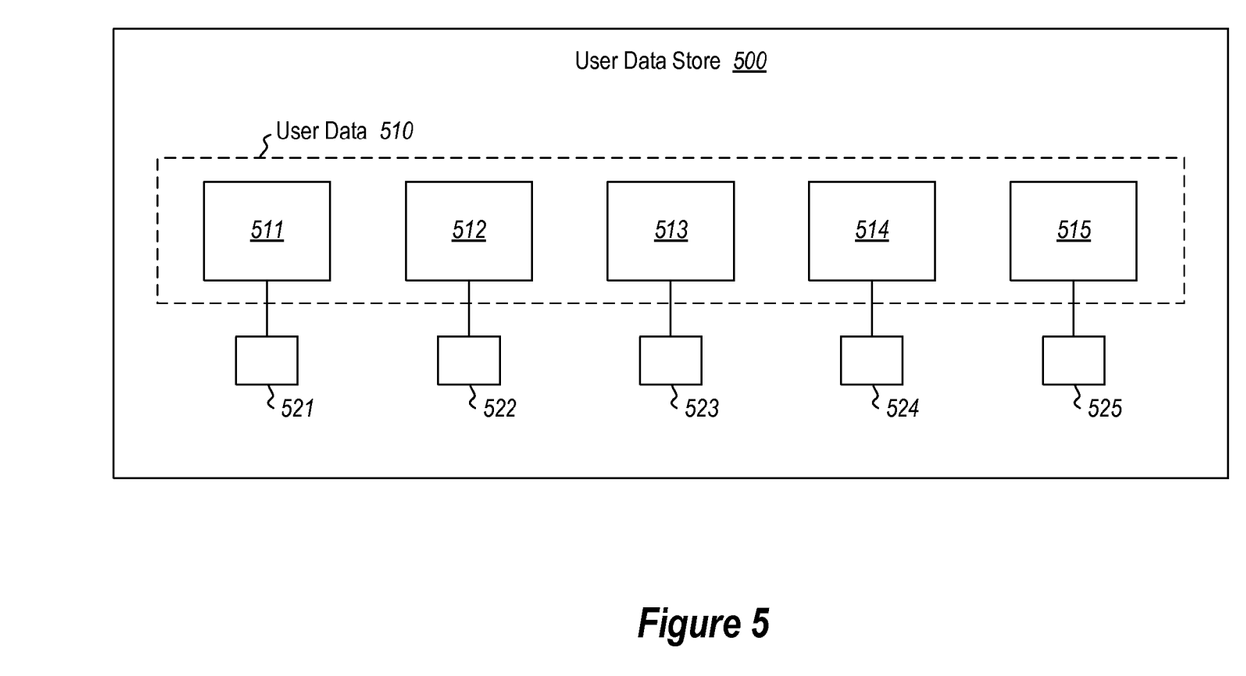
FIG. 5 illustrates a more detailed abstract diagram of a user data store that represents an example of the user data store of FIG. 2, and which includes user data in the form of a number of user-specific data stores.

Referring back to FIG. 2, the user data store 240 contains user data for each of the potential users of the game servers 220, or in other words, for each user of the clients 210 that may successfully request gaming service from the game servers 220. For instance, FIG. 5 illustrates a more detailed abstract diagram of a user data store 500 that represents an example of the user data store 240 of FIG. 2. The user data store 500 includes user data 510 in the form of a number of user-specific data stores. For instance, the user data 510 includes user 511 for one user identity 521, another user data 512 for another user identity 522, yet another user data 513 for a user identity 523, user data 514 for another user identity 524, and user data 515 for user identity 525. For instance, in FIG. 2, suppose there was a case in which each of the clients 210 is associated with a corresponding user identity, the user data 511-515 may correspond to the respective users of the clients 211-215. That said, there is no need for one-to-one correlation between users and clients. That correlation is just for purposes of simplicity. A user of one client machine may wander to another client machine, and thus a single user may have multiple client 210. Also, a single client machine may be shared by multiple users. Combinations of the above are also possible. Also, a user may be on multiple clients potentially connected to different game servers. For instance, a user might be playing a first game on their desktop personal computer, and be playing a second game on their tablet.

Figure 6:
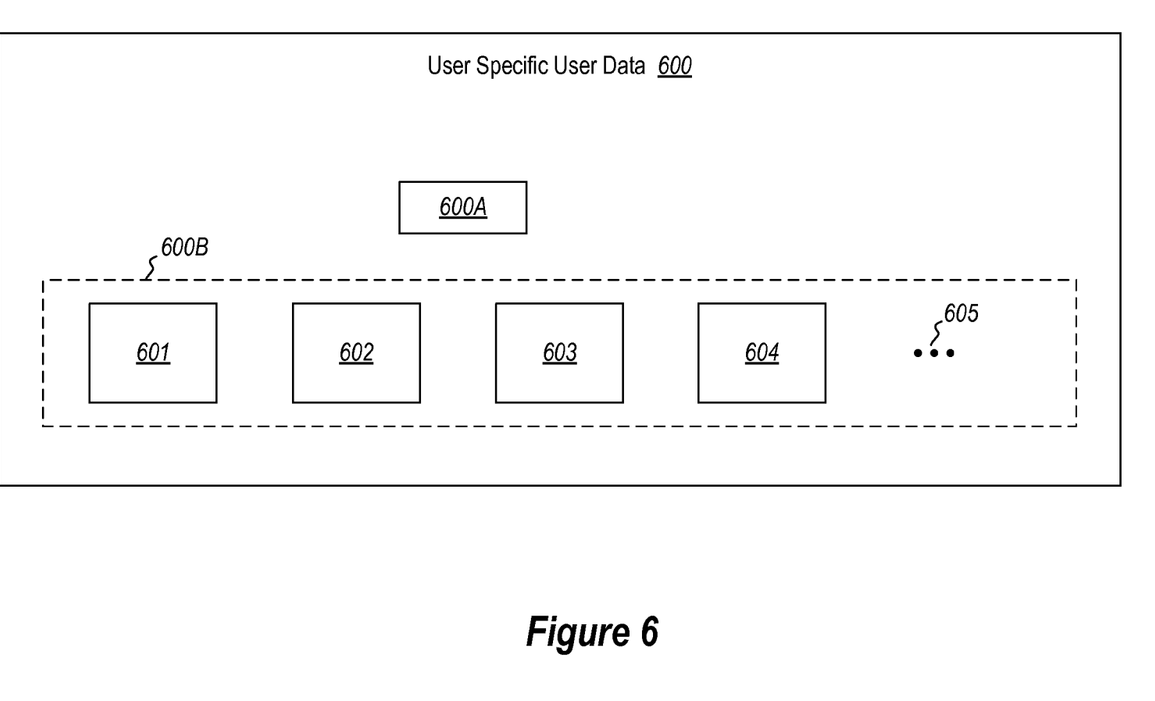
FIG. 6 abstractly illustrates user specific user data, represents an example of any of the user specific user data of FIG. 5, and which includes general user data for that user, as well as game specific user data for that user.

FIG. 6 abstractly illustrates user specific user data 600, and represents an example of any of the user specific user data 511-515 of FIG. 5. The user specific user data 600 includes general user data 600A that is not specific to any game. However, the user specific user data 600 also includes game specific user data 600B. For instance, the game specific user data 600B includes game specific data 601, game specific data 602, game specific data 603, and game specific data 604. Accordingly, the user specific user data 600 includes general user data and game specific user data for four different games. The number of game-specific user data will depend, however, on the number of games that the user has played and for which the user is utilizing the user data store. Accordingly, the ellipses 605 represents that there may be any number of game specific user data portions.

Figure 7:
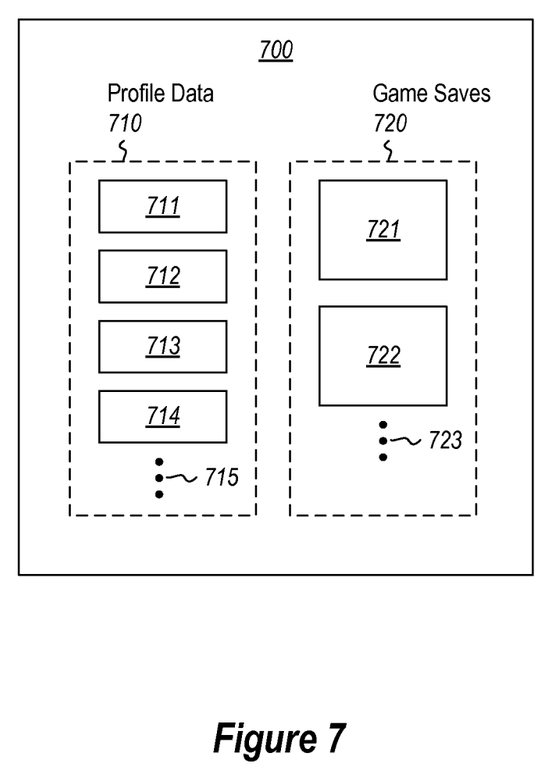
FIG. 7 abstractly illustrates a game specific user data, and is an example of any of the game specific user data portions of FIG. 6.

FIG. 7 abstractly illustrates a game specific user data 700, and is an example of any of the game specific user data portions 601 through 604 of FIG. 6. The game specific user data 700 includes user profile data 710, and game saves 720. The user profile data 710 includes, for example, a gamer tag 711, game achievements 712, achievement pictures 713, gamer settings 714, and other game data as represented by the ellipses 715. The game saves 720 includes two game saves 721 and 722, although the ellipses 723 represents that there may be other numbers of game saves also depending on the game history and functionality.

Figure 8:
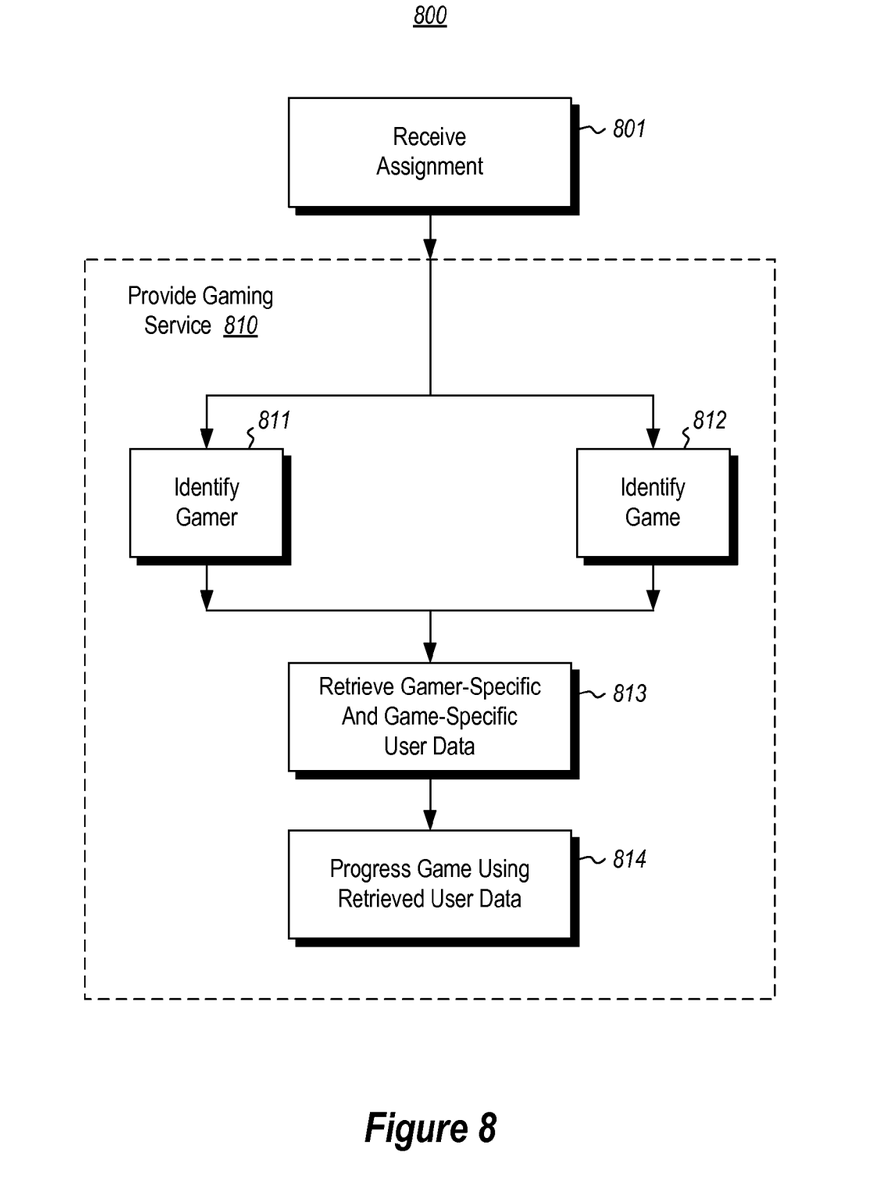
FIG. 8 illustrates a flowchart of a method for initiating a gaming service session by a game server.

FIG. 8 illustrates a flowchart of a method 800 for initiating a gaming service session by a game server. The game session is initiated when the game server receives an assignment (act 801) to provide service to a particular gamer. This begins the transition of the game server from a non-user specific state (or an unused state) to a user specific state (or a used state). As previously mentioned, the connection server (230, 300) selects the game server using the selection logic 301 and dispatches the assignment to the game server. In response, the selected game server provides the gaming service to the particular gamer (act 810).

As part of providing this gaming service (act 810), the selected game server identifies (act 811) the particular gamer associated with the assignment. For instance, the game server may authenticate the particular gamer. The game server might, for example, receive a username and password from the game and/or receive a token from the gamer. In order to determine whether or not the username and password match and/or the token properly authenticates the user, the game server might download authentication user data from the user data store 240. The game server also identifies (act 812) a game to be played by the particular gamer. In most or all cases, this might be the game requested to be played by the gamer.

The game server then retrieves (act 813) a subset of the available user data for the particular gamer from the user data store. For instance, referring to FIG. 2, suppose that the connection server 230 selected the game server 221 to provide service to a gamer on the client 212. The game server 221 would authenticate that gamer, identify the game to be played, and then retrieve the corresponding user data from the user data store 240. The retrieved user data is a subset of the available user data for the particular gamer. For instance, the subset might just be the user data associated with the particular game to be played. As an example, referring to FIG. 6, rather than retrieve all of the user specific user data 600 associated with the authenticated gamer, the game server might perhaps only retrieve some of the generic user specific data 600A, as well as perhaps only the game specific user data 603. This significantly reduces the use of the communications channel between the game server and the user data store, and preserves processing resources of both game server and user data store. Accordingly, this also reduces the time for getting the game server is the user-specific state sufficient to start the game, thereby giving the gamer a better experience getting the game started.

Once the game server has the game specific and user specific data, the game server progresses (act 814) the identified game for the identified user using the retrieved user data. This progressing of the game might involve initiating the game, or perhaps continuing the identified game from a state of a prior game save.

Figure 9:
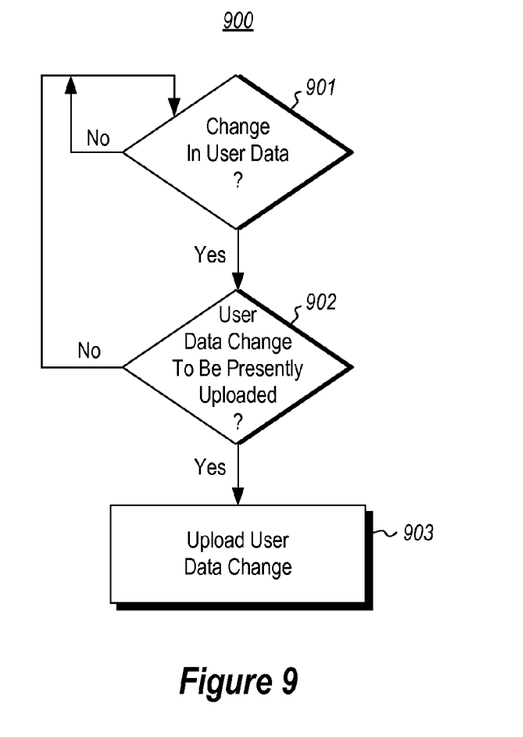
FIG. 9 illustrates a flowchart of method for addressing user state changes when progressing the game.

FIG. 9 illustrates a flowchart of method 900 for addressing user state changes when progressing the game. As the game is progressed, there might, or might not, be user data changes that occur during the game. For instance, a user data change might occur if, for instance, a game save occurs, or if the user profile for that game changes. For instance, a user might change a gamer tag, or perhaps a game setting changed or a challenge has been achieved. If a change in user data has not occurred at a particular instant in time ("No" in decision block 901), then no further processing of method 900 is necessary. However, when a change in user data has occurred ("Yes" in decision block 901), then the method 900 proceeds.

In particular, there are several user data changes that may not warrant immediate upload ("No" in decision block 902). For instance, some user data changes may result in deferred upload to the user data store, perhaps even until after the gaming session is completed. As an example, perhaps game saves are deferred until the gaming session is completed. In that case ("No" in decision block 902), the method 900 does not proceed further for now.

On the other hand, if the user data change does warrant immediate upload ("Yes" in decision block 902), then the user data change is uploaded (act 903) to the user data store. For instance, perhaps changes to the user profile portion of the user data (such as new achievements) might warrant immediate uploading.

Figure 10:
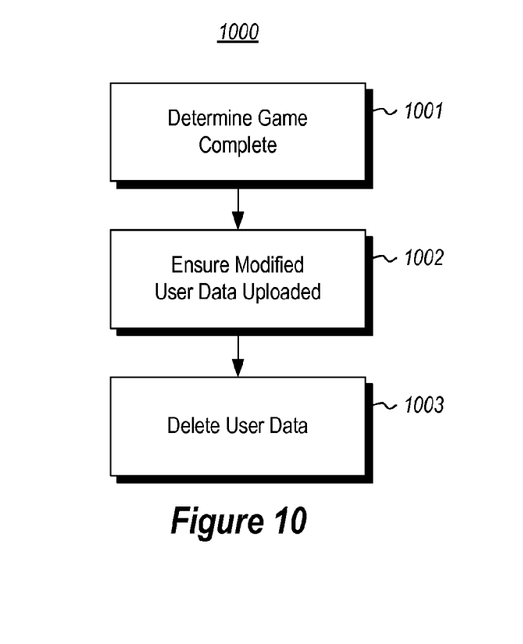
FIG. 10 illustrates a flowchart of a method for completing a gaming session.

FIG. 10 illustrates a flowchart of a method 1000 for completing a gaming session. Upon the game server determining (act 1001) that the progressing of the identified game has completed, the game server will prepare to return to the unused non-user specific state. Accordingly, after ensuring (act 1002) that any modified user data is uploaded to the user data store, the game server deletes (act 1003) the user data associated with the particular gamer from the game server. This allows the game server to be returned back to the bank of game servers that are available for assignment for another gaming session.

Thus, the principles described herein provide a system in which a bank of game servers may be drawn from in order to serve any one of numerous users, for any one of numerous potential games. Furthermore, when initiating a gaming service, the amount of user data downloaded from a user data store is kept low, perhaps limited to just the user data for the particular selected game. This reduces lag time between the time that the game service is requested and the time that the game is initiated, thereby improving consumer appeal and more closely simulating the experience of gaming with a console local to the user. Furthermore, the processing resources of the game server and user data store (and the bandwidth therebetween) are preserved, thereby allowing the number of game servers and served gamers to be scaled.

Furthermore, since the game state is maintained at the game server, the game server may preserve game save state at any point. If, for example, the game service detects that input has not been received from the user for some time, the game server might generate a game save at that point. If the game server still has not received user input from the user, then perhaps the user has walked away from the game, or perhaps network connectivity has been lost. In that case, if a long time has passed without user input, the game save made immediately after the last input might be uploaded to the user data store, and the game session may be terminated. When the user returns, or network connectivity restored, the user may continue right where the user left off. Furthermore, the user might issue an explicit save command at any point in the game progress, causing the game server to generate a game save. This explicit ability to save might be performed at any time, and any number of times. Accordingly, perhaps to preserve bandwidth, the game server does not upload the game save until the game session is completed, and then only perhaps uploads the latest game save. Thus, the principles described herein also permit flexible and resilient game save capability.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for providing more efficient remote storage and retrieval of user data required for initiating an online gaming session, the method comprising:
    storing, at a remote data store, user data which comprises a plurality of user specific data stores, wherein each of the plurality of user specific data stores includes general user data that is not specific to any game and game specific user data that is specific to one or more games;
    receiving at a connection server, a request by a particular gamer to initiate a gaming service session;
    assigning one or more gaming servers to provide the gaming service for the particular gamer,
        wherein an index of the connection server includes a state for each of the one or more gaming servers, and
        wherein a selection logic of the connection server assigns the one or more gaming servers according to the state;
    changing the state of each of the assigned one or more gaming servers to a used state that is specific to the particular gamer;
    providing by the assigned one or more gaming servers in the used state, the requested gaming service session to the particular gamer by performing the following:
        identifying the particular gamer that initiated the request;
        identifying a game to be played by the particular gamer during the requested gaming service session;
        retrieving from the remote data store a subset of the user data, wherein the subset of user data includes:
            at least a portion of the general user data that is not specific to any game, and
            some, but not all, of the game specific user data, wherein the retrieved game specific user data corresponds to the identified game and represents only that game specific user data required to play the identified game during the requested gaming service session; and
        connecting to the client computing system to provide for the particular gamer the requested gaming service session for the identified game.

2. The method in accordance with claim 1, further comprising making changes to the state of each of the assigned one or more gaming servers as the identified game is played by the particular user.

3. The method in accordance with claim 2, further comprising uploading the changes to the state of each of the assigned one or more gaming servers to the user data at the remote data store.

4. The method in accordance with claim 3, wherein the one or more gaming sever determine that the requested gaming service session for the identified game has been completed before uploading the changes.

5. The method in accordance with claim 4, further comprising, in response to the one or more gaming servers determining that the requested gaming service session for the identified game has been completed, deleting the user data associated with the particular gamer from the assigned one or more gaming servers.

6. The method in accordance with claim 1, wherein the retrieved game specific user data defines a state of a prior game save for the identified game.

7. The method in accordance with claim 1, wherein identifying the particular gamer comprises authenticating the particular gamer at the assigned one or more gaming servers.

8. A computer program product comprising one or more computer-readable hardware storage devices having thereon computer-executable instructions that are executable by one or more processors of a computing system to cause the computing system to provide for more efficient remote storage and retrieval of user data required for initiating an online gaming session, by at least causing the computing system to implement:
    an act of storing, at a remote data store, user data which comprises a plurality of user specific data stores, wherein each of the plurality of user specific data stores includes general user data that is not specific to any game and game specific user data that is specific to one or more games;
    an act of receiving, at a connection server, a request by a particular gamer to initiate a gaming service session;
    an act of assigning one or more gaming servers to provide the gaming service for the particular gamer,
        wherein an index of the connection server includes a state for each of the one or more gaming servers, and
        wherein a selection logic of the connection server assigns the one or more gaming servers according to the state;
    an act of changing the state of each of the assigned one or more gaming servers to a used state that is specific to the particular gamer;
    an act of providing, by the assigned one or more gaming servers in the used state, the requested gaming service session to the particular gamer by performing the following:
        identifying the particular gamer that initiated the request;
        identifying a game to be played by the particular gamer during the requested gaming service session;
        retrieving from the remote data store a subset of the user data, wherein the subset of user data includes:
            at least a portion of the general user data that is not specific to any game, and
            some, but not all, of the game specific user data, wherein the retrieved game specific user data corresponds to the identified game and represents only that game specific user data required to play the identified game during the requested gaming service session; and
        connecting to the client computing system to provide for the particular gamer the requested gaming service session for the identified game.

9. The computer program product in accordance with claim 8, wherein the computer-executable instructions further cause the computing system to make changes to the state of each of the assigned one or more gaming servers as the identified game is played by the particular user.

10. The computer program product in accordance with claim 9, wherein the computer-executable instructions further cause the computing system to upload the changes to the state of each of the assigned one or more gaming servers to the user data at the remote data store.

11. The computer program product in accordance with claim 10, wherein the one or more gaming servers determine that the requested gaming service session for the identified game has been completed before uploading the changes.

12. The computer program product in accordance with claim 11, further comprising, in response to the one or more gaming servers determining that the requested gaming service session for the identified game has been completed, deleting the user data associated with the particular gamer from the assigned one or more gaming servers.

13. The computer program product in accordance with claim 8, wherein the retrieved game specific user data defines a state of a prior game save for the identified game.

14. The computer program product in accordance with claim 8, wherein identifying the particular gamer comprises authenticating the particular gamer at the assigned one or more gaming servers.

15. An online gaming system comprising:
 a connection server having one or more processors and memory;
 a pool of gaming servers that are in an unused state that is non-gamer specific, each gaming server having one or more processors and memory;
 a plurality of client computing systems each having one or more processors and memory;
 a remote data store; and
 a computer program product comprising a storage device having computer-executable instructions stored thereon that are executable by one or more processors to cause the processors to implement a computer-implemented method which provides for more efficient remote storage and retrieval of user data required for initiating an online gaming session, and wherein the computer-implemented method comprises:
  storing, at the remote data store, user data which comprises a plurality of user specific data stores, wherein each of the plurality of user specific data stores includes general user data that is not specific to any game and game specific user data that is specific to a one or more games;
  receiving, at the connection server, a request by a particular gamer to initiate a gaming service session;
  assigning one or more gaming servers to provide the gaming service for the particular gamer,
   wherein an index of the connection server includes a state for each of the one or more gaming servers, and
   wherein a selection logic of the connection server assigns the one or more gaming servers according to the state;
  changing the state of each of the assigned one or more gaming servers to a used state that is specific to the particular gamer;
  providing, by the assigned one or more gaming servers in the used state, the requested gaming service session to the particular gamer by performing the following:
   identifying the particular gamer that initiated the request;
   identifying a game to be played by the particular gamer during the requested gaming service session;
   retrieving from the remote data store a subset of the user data, wherein the subset of user data includes:
    at least a portion of the general user data that is not specific to any game, and
    some, but not all, of the game specific user data, wherein the retrieved game specific user data corresponds to the identified game and represents only that game specific user data required to play the identified game during the requested gaming service session; and
   connecting to the client computing system to provide for the particular gamer the requested gaming service session for the identified game.

16. The system in accordance with claim 15, wherein the computer-implemented method further comprises making changes to the state of each of the assigned one or more gaming servers as the identified game is played by the particular user.

17. The system in accordance with claim 16, wherein the computer-implemented method further comprises uploading the changes to the state of each of the assigned one or more gaming servers to the user data at the remote data store.

18. The system in accordance with claim 17, wherein the one or more gaming servers determine that the requested gaming service session for the identified game has been completed before uploading the changes.

19. The system in accordance with claim 18, further comprising, in response to the one or more gaming servers determining that the requested gaming service session for the identified game has been completed, deleting the user data associated with the particular gamer from the assigned one or more gaming servers.

20. The system in accordance with claim 15, wherein the retrieved game specific user data defines a state of a prior game save for the identified game.

* * * * *